United States Patent Office 3,131,205  
Patented Apr. 28, 1964

3,131,205  
N-(SILICO-ALKYL) POLYNITRO-ALKYL AMINES AND THEIR PREPARATION  
Milton B. Frankel, Menlo Park, Calif., assignor to Aerojet-General Corporation, Azusa, Calif., a corporation of Ohio  
No Drawing. Filed Mar. 9, 1962, Ser. No. 180,397  
10 Claims. (Cl. 260—448.2)

This invention relates to novel aliphatic nitro silanes and to their method of preparation. In particular, the invention relates to N-(silico-alkyl) polynitro-alkyl amines, their preparation, and use.

It is an object of this invention to synthesize new N-(silico-alkyl) polynitro-alkyl amines. A more specific object of this invention is to prepare N-(silico-alkyl) polynitro-alkyl amines which are especially useful in explosives. These and other objectives of this invention will appear hereinafter.

The novel N-(silico-alkyl) polynitro-alkyl amines of this invention have the following general formula:

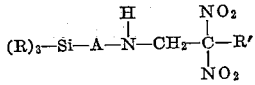

In the above formula, the R groups are alkyl and preferably lower alkyl, i.e., of from 1 to about 10 carbon atoms such as methyl, ethyl, isopropyl, octyl, etc. All of the R groups need not be the same. Thus, for example, one R group may be methyl; the second, ethyl; and the third, octyl. In the above formula, R' is the same or different and is selected from the class consisting of alkyl and nitroalkyl groups, the lower alkyl and lower nitroalkyl groups being preferred. The A group is an alkylene radical, preferably lower alkylene such as ethylene, pentamethylene, and decamethylene. The R, R', and A groups may be branched or straight chain.

The novel N-(silico-alkyl) polynitro-alkyl amines of this invention are prepared by reacting a 2,2-polynitro alkanol with an N-(silico-alkyl) amine in accordance with the general reaction scheme set forth below:

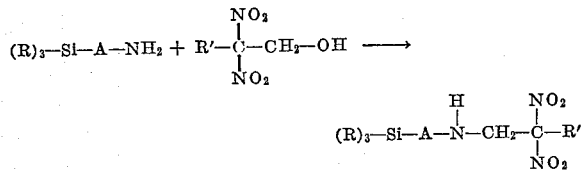

wherein R, R', and A are as defined above. In the above reaction the N-(silico-alkyl) amine may be either in the form of the free amine or in the form of the amine hydrohalide salt. The latter is preferred, especially the amine hydrochloride salt, since it is normally more stable.

The reaction is conveniently carried out in any polar solvent in which the reactants are soluble, i.e., water, methanol, ethanol, etc. It is to be understood that when the N-(silico-alkyl) amine reactant is in the form of the hydrohalide salt the solvent is preferably made alkaline by the addition of a base which is more strongly basic than the N-(silico-alkyl) amine and which is capable of converting the amine hydrochloride to the free amine. Typical bases which will liberate the free amine are sodium hydroxide, potassium hydroxide, and lithium hydroxide.

The proportions of the two reactants employed in the above reaction are not critical. Normally, stoichiometrically equivalent amounts are used since this results in the most economical utilization of the reactants. The reaction temperature should normally be sufficiently high so that the reactants will dissolve to a substantial degree in the reaction medium but below the decomposition temperature of the 2,2-polynitro alkanol. Normally, the reaction is conducted at a temperature between about 0° C. and about 100° C. The most preferred reaction temperature is room temperature (25° C).

Pressure is not critical in this reaction; therefore, while any pressure can be used, the reaction is normally run under atmospheric pressure. Agitation of the reactants, such as by a mechanical stirrer, while desirable in that it increases the reaction rate, is not necessary. The N-(silico-alkyl) polynitro-alkyl amines of this invention are normally liquids and can be isolated in conventional manner by extraction and/or distillation.

To more clearly illustrate my invention, the following example is presented. It is to be understood, however, that this example is intended merely as an illustrative embodiment of the invention and should not be construed as limitative of the scope of said invention in any way. In the example, the percentages are by weight unless otherwise indicated.

EXAMPLE I

Preparation of N-(2,2-Dinitropropyl) N-[2,2-Dimethyl (2-Silicopropyl)] Amine

Into a 200-ml. three-necked flask, fitted with a mechanical stirrer and dropping funnel, was placed 14.0 g. of N-[2,2-dimethyl (2-silicopropyl)] amine hydrochloride. [This compound may be prepared by the method shown by Sommer et al., C.A., vol. 47, 483 (1953).] To the above material were then added 15 g. of 2,2-dinitropropanol and 50 ml. of water. A solution of 4.0 g. of sodium hydroxide in 30 ml. of water was added dropwise at room temperature. A yellow oil separated and the reaction mixture was extracted with ether. The ether extracts were dried and concentrated to give 18.2 g. (77.4 percent) of yellow oil. The product was distilled from a bulb tube and the boiling point of the resulting product was 57 to 64° C./1 mm. The index of refraction was 1.4539. When permitted to stand, the yellow liquid partially crystallized.

Analysis.—Calc'd for $C_7H_{17}N_3O_4Si$: percent C, 35.73; percent H, 7.29; percent N, 17.86; percent Si, 11.93. Found: percent C, 35.72; percent H, 7.28; percent N, 17.67; percent Si, 11.56.

The 2,2-dinitropropanol starting material for the reaction of this invention is readily obtained by reacting nitroethane with formaldehyde as is more fully disclosed in assignee's copending U.S. application Serial No. 242,437, filed August 17, 1951.

Other N-(silico-alkyl) polynitro-alkyl amines can be prepared by the method of Example I. For example, 2,2-dinitro-1-butanol; 2,2-dinitro-1-pentanol; 2,2,4,4-tetranitro-1-butanol; and 2,2,4,4-tetranitro-1-pentanol react with N-[3,3-diethyl (3-silico-pentyl)] amine; N-[2,2-dimethyl (2-silico-butyl)] amine; N-[2,2-diethyl (2-silico-butyl)] amine and N-[3-methyl-3-ethyl (3-silico-pentyl)] amine to yield N-(2,2-dinitrobutyl) N-[3,3-diethyl (3-silico-pentyl)] amine; N-(2,2-dinitropentyl) N-[2,2-dimethyl (2-silico-butyl)] amine; N-(2,2,4,4-tetranitrobutyl) N-[2,2-diethyl (2-silico-butyl)] amine; and N-(2,2,4,4-tetranitropentyl) N-[3-methyl-3-ethyl (3-silico-pentyl)] amine; respectively.

The N-(silico alkyl) polynitro-alkyl amines of this invention, which contain a plurality of nitro groups, are inherently useful as high explosives. These compounds can also be used in any conventional explosive missile, projectile, rocket, or the like, as the main explosive charge. An example of such a missile is described in U.S. Patent 2,470,162, issued May 17, 1949. One way of using such high explosives in a device such as that disclosed in U.S. Patent 2,470,162 is to absorb the liquid explosive in an absorbent material such as cellulose, wood pulp, or sawdust. The resultant dynamite-type explosive can then be packed into the warhead of the missile. A charge thus prepared is sufficiently insensitive to withstand the shock entailed in the ejection of a shell from a gun barrel or a rocket launching tube under the pressure developed from ignition of a propellant charge, and can be caused to explode on operation of an impact or time-fuse mechanism firing a detonating explosive such as lead azide or mercury fulminate.

It will be understood that various modifications may be made in this invention without departing from the spirit thereof or the scope of the appended claims.

I claim:

1. Novel compounds of the formula

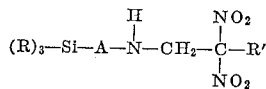

wherein R is an alkyl radical, R′ is a member of the class consisting of alkyl and nitroalkyl groups, and A is an alkylene radical.

2. The compounds of claim 1 wherein R and R′ are methyl.

3. The compounds of claim 1 wherein A is a methylene radical.

4. The compounds of claim 1 wherein R and R′ are methyl and A is methylene.

5. The method of preparing N-(silico-alkyl) polynitroalkyl amines having the formula

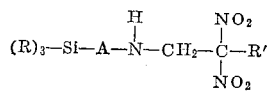

which comprises reacting a 2,2-polynitro alkanol having the formula

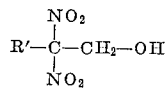

with an N-(silico-alkyl) amine having the formula

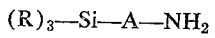

wherein R is an alkyl radical, R′ is a member of the class consisting of alkyl and nitroalkyl groups, and A is an alkylene radical.

6. The method of claim 5 wherein the N-(silico-alkyl) amine is in the form of the hydrohalide salt.

7. The method of claim 5 wherein the N-(silico-alkyl) amine is in the form of the hydrochloride salt.

8. The method of claim 5 wherein the reaction is conducted in the presence of a polar solvent in which the reactants are soluble.

9. The method of claim 5 wherein the reaction is conducted at a temperature of between about 0° C. and about 100° C.

10. The method of claim 5 wherein the reaction is conducted at a temperature of about 25° C.

No references cited.